(12) United States Patent
Blonz et al.

(10) Patent No.: US 12,476,336 B2
(45) Date of Patent: Nov. 18, 2025

(54) ELECTROCHEMICAL ELEMENT AND CORRESPONDING BATTERY

(71) Applicant: SAFT, Levallois Perret (FR)

(72) Inventors: Valentin Blonz, Le Bouscat (FR); Alexandre Beugnon, Le Pian Medoc (FR)

(73) Assignee: SAFT, Levallois Perret (FR)

( * ) Notice: Subject to any disclaimer, the term of this patent is extended or adjusted under 35 U.S.C. 154(b) by 501 days.

(21) Appl. No.: 17/926,436

(22) PCT Filed: May 18, 2021

(86) PCT No.: PCT/EP2021/063112
§ 371 (c)(1),
(2) Date: Nov. 18, 2022

(87) PCT Pub. No.: WO2021/233898
PCT Pub. Date: Nov. 25, 2021

(65) Prior Publication Data
US 2023/0187793 A1   Jun. 15, 2023

(30) Foreign Application Priority Data
May 19, 2020 (FR) .................................... 20 05031

(51) Int. Cl.
*H01M 50/548* (2021.01)
*H01M 10/647* (2014.01)
(Continued)

(52) U.S. Cl.
CPC ....... *H01M 50/548* (2021.01); *H01M 10/647* (2015.04); *H01M 50/105* (2021.01); *H01M 50/119* (2021.01)

(58) Field of Classification Search
CPC ............. H01M 50/548; H01M 50/105; H01M 50/119; H01M 10/647
See application file for complete search history.

(56) References Cited

U.S. PATENT DOCUMENTS 5,419,982 A    5/1995  Tura et al.
10,490,781 B2  11/2019 Jang
(Continued)

FOREIGN PATENT DOCUMENTS

CN    202373667 U    8/2012
CN    108400385 A    8/2018
(Continued)

OTHER PUBLICATIONS

Translation CN202259540 (Year: 2022).*
(Continued)

*Primary Examiner* — Jane J Rhee
(74) *Attorney, Agent, or Firm* — Troutman Pepper Locke LLP (57) ABSTRACT

This electrochemical cell for a battery, comprises a first electrode of a first polarity, a first terminal of the first polarity, a second electrode of a second polarity, a second terminal of the second polarity, an envelope comprising two walls. The envelope comprises two first edges and two second edges forming an enveloping quadrilateral. The first terminal of the first polarity and/or the second terminal of the second polarity is disposed entirely within the enveloping quadrilateral. The two walls each comprise a metal base foil having a thickness of between 20 μm and 150 μm. The first terminal of the first polarity is arranged in a first corner of the enveloping quadrilateral and the second terminal of the second polarity is arranged in a second corner of the enveloping quadrilateral, different from the first corner.

13 Claims, 9 Drawing Sheets

(51) Int. Cl.
*H01M 50/105* (2021.01)
*H01M 50/119* (2021.01)

(56) References Cited

U.S. PATENT DOCUMENTS

| | | |
|---|---|---|
| 2013/0101891 A1 | 4/2013 | Rich et al. |
| 2013/0130087 A1 | 5/2013 | Kawaguchi et al. |
| 2019/0237830 A1 | 8/2019 | Kim et al. |

FOREIGN PATENT DOCUMENTS

| | | |
|---|---|---|
| KR | 10-2016-0041402 A | 4/2016 |
| WO | 91/20100 A1 | 12/1991 |
| WO | 95/16283 A1 | 6/1995 |
| WO | 03/026042 A1 | 3/2003 |
| WO | 2005/039013 A2 | 4/2005 |
| WO | 2012/057854 A1 | 5/2012 |
| WO | 2015156327 A1 | 10/2015 |
| WO | 2016/205663 A1 | 12/2015 |
| WO | WO-2019121332 A1 * | 6/2019 |

OTHER PUBLICATIONS

Translation KR20160044343 (Year: 2016).*
Rapport De Recherche Préliminaire issued in French Patent Application No. 2005031 dated Jan. 22, 2021.
International Search Report issued in International Patent Application No. PCT/EP2021/063112 dated May 31, 2021.

* cited by examiner

ELECTROCHEMICAL ELEMENT AND CORRESPONDING BATTERY

CROSS REFERENCE TO RELATED APPLICATIONS

The present application is a U.S. National Phase Application under 35 U.S.C. § 371 of International Patent Application No. PCT/EP2021/063112 filed May 18, 2921, which claims priority of French Patent Application No. 20 05031 filed May 19, 2020. The entire contents of which are hereby incorporated by reference.

FIELD OF THE INVENTION

The present invention relates to an electrochemical cell for a battery, of the type comprising:
- a first electrode of a first polarity,
- at least one first terminal of the first polarity,
- a second electrode of a second polarity,
- at least one second terminal of the second polarity,
- an envelope comprising a first wall and a second wall,
- the envelope comprising two first edges and two second edges,
- the first and second edges forming an enveloping quadrilateral.

BACKGROUND

Electrochemical cells and batteries are known from WO95/16283. The electrochemical cell disclosed herein comprises terminals arranged in the corners of the electrochemical cell.

The battery made from the electrochemical cells has a plastic casing. The electrochemical cell of this paper is used to manufacture parallelepiped batteries.

Other electrochemical assemblies or electrochemical batteries are known from CN108400385; WO2016/205663A1 (EP3311443); KR20160041402A; U.S. Pat. No. 10,490,781 B2 (US20150364729A): CN202373667U; US2013101891A1; WO2012057854A1; WO2005039013A2 (EP1678804); WO03026042A1 (EP1428272); and WO9120100A1 (EP0487699).

SUMMARY

The purpose of the invention is to provide an electrochemical cell that has a large electrical energy storage capacity for a given volume. In addition, the electrochemical cell should be easy and cheap to manufacture and have a high degree of operational safety.

To this end, the invention relates to the above-mentioned electrochemical cell for a battery, characterized in that
- the or each first terminal of the first polarity and/or the or each second terminal of the second polarity is disposed entirely within the enveloping quadrilateral, in that
- the first wall and the second wall each comprise a metal base foil, the metal base foils each have a thickness of between 20 μm and 150 μm, in particular between 30 μm and 60 μm,
- the first terminal of the first polarity is located in a first corner of the enveloping quadrilateral and
- the second terminal of the second polarity is located in a second corner of the enveloping quadrilateral, different from the first corner.

According to particular embodiments of the electrochemical battery cell, the electrochemical battery cell may comprise one or more of the following features:
- the first corner and the second corner are adjacent to the same one of the first edges or the second edges, in particular the first edges each being a long edge and the second edges each being a short edge;
- the two first edges are substantially parallel to each other and/or the two second edges are substantially parallel to each other, and in particular substantially perpendicular to the first edges;
- the electrochemical cell comprises exactly one first terminal of the first polarity and one second terminal of the second polarity;
- the electrochemical cell comprises two first terminals of the first polarity arranged in the first corner and a third corner of the enveloping quadrilateral, and two second terminals of the second polarity arranged in the second corner and a fourth corner of the enveloping quadrilateral;
- either the first corner and the third corner are adjacent corners and the second corner and the fourth corner are adjacent corners, or the first corner and the third corner are opposite corners and the second corner and the fourth corner are opposite corners;
- the metal foil of the first wall and the metal foil of the second wall are formed by a single metal base foil, the metal base foil comprising a folded portion forming one of the first or second edges, the other of the first edges and second edges being formed by edges of the metal base foil superimposed and attached to each other, in particular by heat welding;
- the metal foil of the first wall and the metal foil of the second wall are two separate, individual metal base foils, each of which has four edges, and wherein each of the first edges and the second edges is formed by two edges of the two base foils superimposed and attached to one another, in particular by heat welding; and
- the or each first terminal of the first polarity and/or each second terminal of the second polarity consists of a superposition of electrode sheets and is not folded.

The invention further relates to a battery of the type comprising a housing and at least one electrochemical cell as defined above.

According to particular embodiments of the battery, the battery may comprise one or more of the following features:
- the battery comprises a cooling device and the cooling device is adapted to remove heat from the electrochemical cell, and in particular from a long edge or from the edge formed by the folded portion.

BRIEF DESCRIPTION OF THE DRAWINGS

The invention will be better understood upon reading the following description, given only as an example, and with reference to the attached drawings, in which.

DETAILED DESCRIPTION

In the following, the term "front view" refers to a view as shown in FIGS. 1 to 3, 5, 8 and 9.

Figure 1:
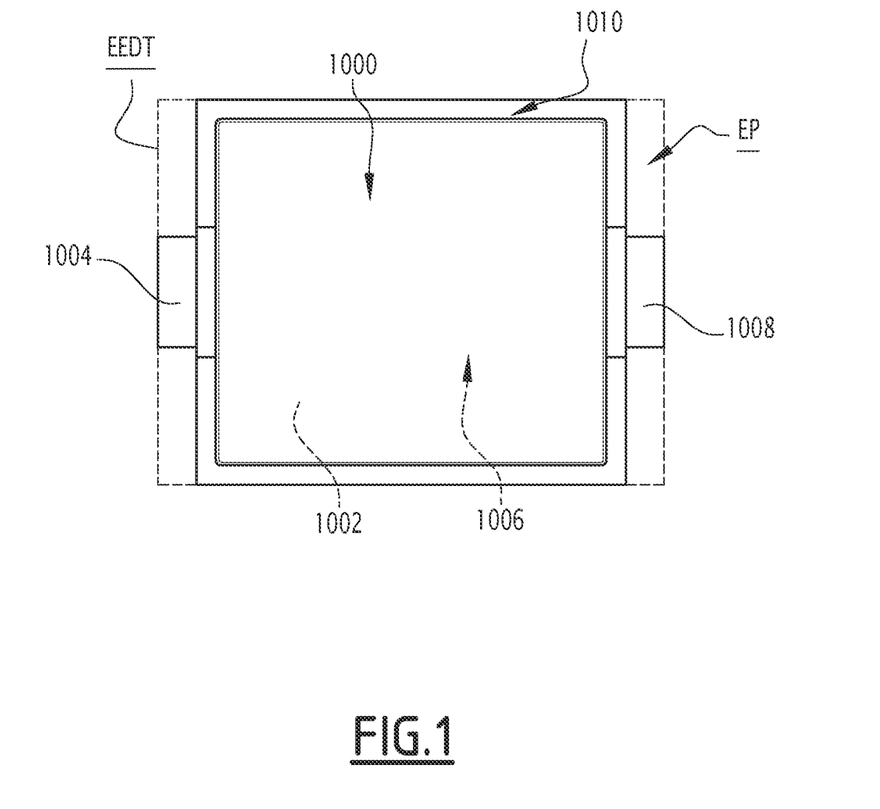
FIG. 1 is a schematic side view of an electrochemical cell according to the prior art.

FIG. 1 shows a schematic side view of an electrochemical cell according to the prior art. This electrochemical cell 1000 comprises a first electrode of a first polarity 1002, a first terminal of the first polarity 1004, a second electrode of a second polarity 1006, and a second terminal of the second polarity 1008. The electrochemical cell 1000 comprises a shell 1010, seen from the front, of substantially rectangular shape and surrounding the first and second electrodes 1002 and 1006. The envelope 1010 thus forms two short and two long edges.

The terminals 1004 and 1008 protrude from the envelope 1010 at the centre of the short edges.

The electrochemical cell 1000 defines, when viewed from the front, i.e. in the plane of FIG. 1, an envelope EEDT which surrounds the envelope 1010 and the electrodes 1002 and 1006. In this case, the envelope EEDT is a rectangle whose sides run parallel to the short edges of the 1010 envelope, coincide with the free edges of the terminals and coincide with the long edges of the 1010 envelope.

The electrochemical cell 1000 thus leads, when viewed from the front, to a wasted space EP, which is free of electrodes and terminals and which corresponds to the area between the edges of the envelope and the envelope on the one hand and the terminals on the other.

The following description contains technical features of the invention. These technical features, although presented in a technical context and possibly in combination with other technical features, may be used individually without the other technical features, provided this is technically possible.

In the description of the various embodiments, similar elements have the same references. Also, unless otherwise stated, each feature described with reference to one embodiment of the invention or to a variant of an embodiment is applicable in isolation or in any technically possible combination to the other embodiments or variants.

Figure 2:
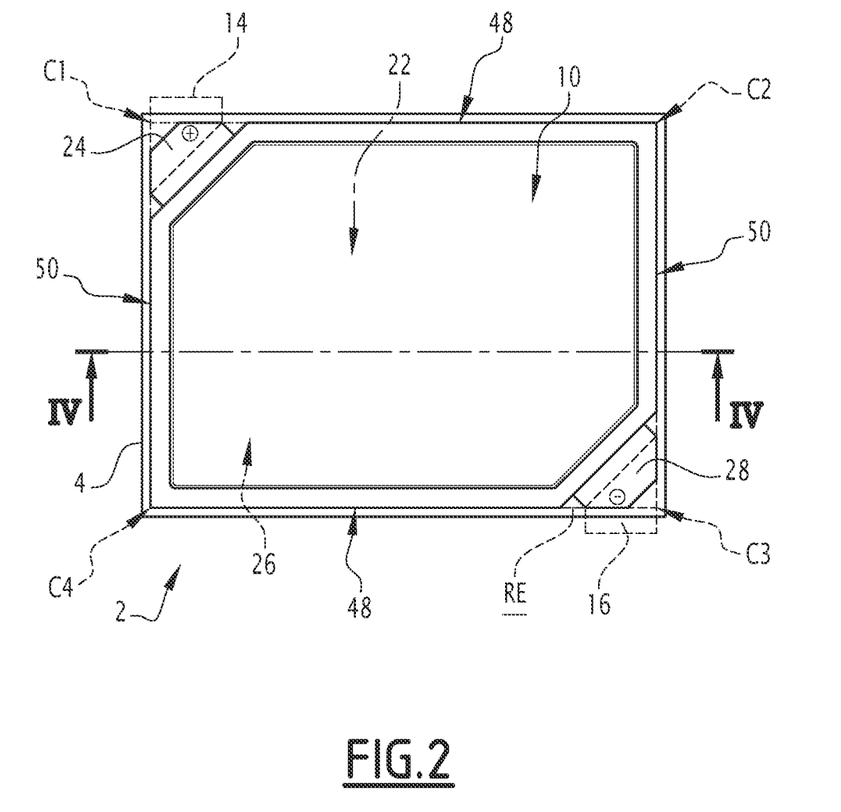
FIG. 2 is a schematic front view of a battery comprising an electrochemical cell according to a first embodiment of the invention.

FIG. 2 shows a battery according to a first embodiment of the invention, designated by the general reference 2. The battery 2 is an electrochemical battery as commonly used in electric vehicles. However, other areas of application for the battery 2 can be envisaged, such as energy storage, electric mobility, aviation and rail.

The battery 2 comprises a housing 4 and at least one electrochemical cell 10. In practice, the battery 2 comprises a number of electrochemical cells 10 connected in series or parallel to achieve the desired voltage and/or capacity. The electrochemical cell 10 is arranged in the housing 4.

The housing 4 is, for example, parallelepipedic, in particular rectangular, and comprises housing walls, a first terminal 14 and a second terminal 16. The housing walls are more rigid than the walls of the electrochemical cell 10 (see below).

The battery 2 may comprise a cooling device, which is not shown in FIG. 2, but will be described in more detail in the description of FIGS. 5 to 9.

The electrochemical cell 10 or each electrochemical cell 10 comprises a first electrode of a first polarity 22, a first terminal of the first polarity 24, a second electrode of a second polarity 26, and a second terminal of the second polarity 28.

The electrochemical cell 10 is for example of the Lithium-Ion type. The first electrode 22 comprises at least one current collector formed from a metal strip, for example of aluminium, coated on at least one side with an active material. For example, in the case of a lithium secondary battery, the first electrode contains active material which may be a metal oxide comprising lithium atoms, such as lithium cobalt dioxide LCO ($LiCoO_2$), NMC ($LiNixMny\ Co_{1-x-y}O_2$), NCA ($LiNixCoyAl_{1-x-y}O_2$), LFP ($LiFePO_4$), LMO ($LiMn_2O_4$) or similar lithiated compounds. The first electrode 22 is for example the positive electrode.

The second electrode 26 comprises at least one current collector formed from a metal strip, for example of copper, coated on at least one side with an active material. For example, in the case of a lithium secondary battery, the second electrode contains an active material which may be a carbonaceous material capable of inserting lithium atoms, such as graphite or silicon, LTO ($Li_4Ti_5O_{12}$) or TNO ($TiNb_2O_7$). The second electrode 26 is for example the negative electrode.

The electrochemical cell 10 comprises a separator, separating the first electrode 22 from the second electrode 26. In the case of a Li-Ion electrochemical cell, the separator is permeable to lithium ions, but electronically insulating. The separator is for example a polyolefin membrane.

The electrochemical cell 10 also comprises an electrolyte, which may be liquid, such as an organic electrolyte containing lithium salts such as $LiPF_6$, solid or gel, such as Polyvinylidene Fluoride (PVDF) polymers or Polyvinylidene Fluoride-Hexafluoropropylene (PVDF-HFP) copolymer.

The first terminal of the first polarity 24 is electrically connected to the first terminal 14 and the second terminal of the second polarity 28 is electrically connected to the second terminal 16. The terminals are adapted to collect the current from the associated electrode. The or each first terminal of the first polarity 24 is attached by welding or soldering to the associated current collector or electrode. Likewise, the or each second terminal of the second polarity 24 is attached by welding or soldering to the associated current collector or electrode. In particular, the or each first terminal of the first polarity 24 is attached by ultrasonic welding to the associated current collector or electrode. Likewise, in particular the or each second terminal of the second polarity 28 is attached by ultrasonic welding to the associated current collector or electrode.

Figure 3:
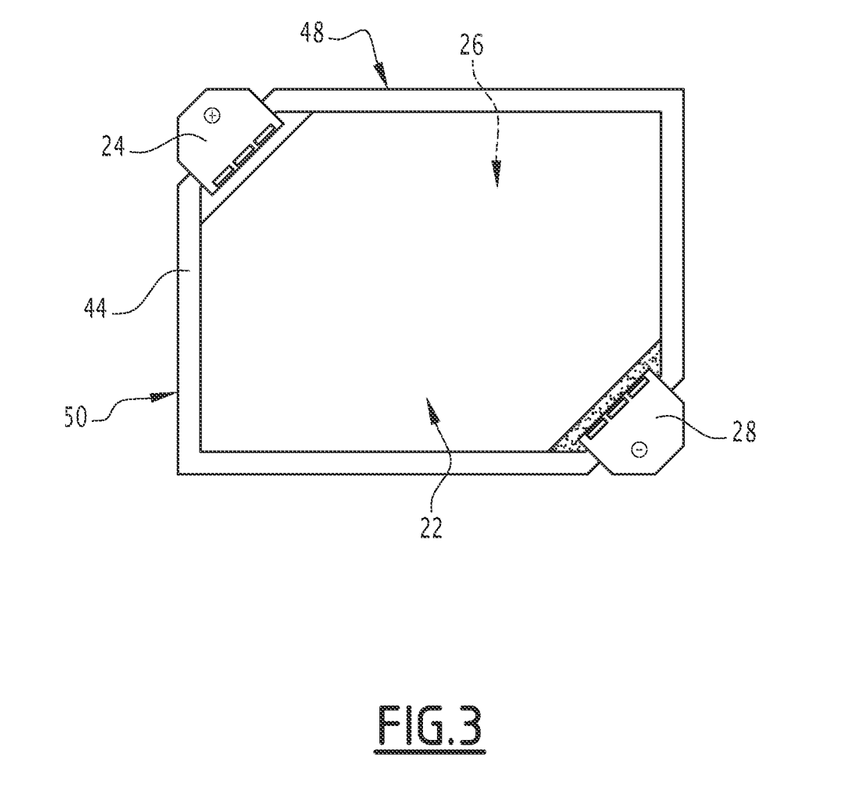
FIG. 3 is a front view of the electrochemical cell in FIG. 2, with one wall of the envelope omitted.
Figure 4:
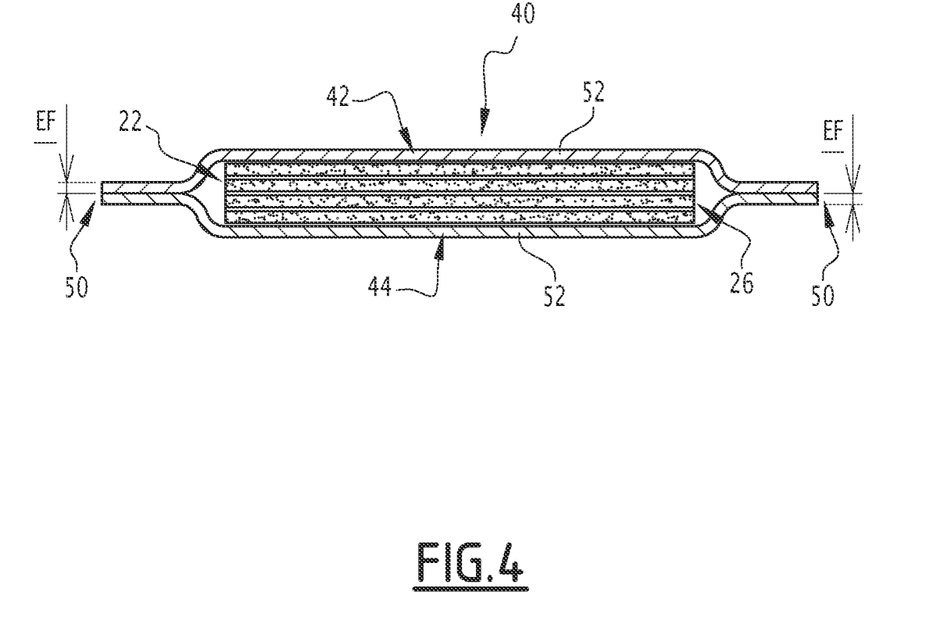
FIG. 4 is a schematic cross-sectional view of the electrochemical cell of FIG. 2.

In the case of the embodiment of FIGS. 2 to 4, the electrochemical cell comprises exactly one first terminal of the first polarity 24 and one second terminal of the second polarity 28. In other words, the terminals 24, 28 of the electrochemical cell consist of a single first terminal and a single second terminal.

The first electrode of the first polarity 22 and the second electrode of the second polarity 26 are flat, surface elements and each contain a carrier foil and one or two electrode layers applied to the carrier foil.

The electrochemical cell 10 or each electrochemical cell 10 comprises an envelope 40 with a first wall 42 and a second wall 44. The envelope 40 is of the "pouch" type, i.e. it has relatively flexible and easily deformable walls. The walls of the envelope 40 are therefore more easily deformable and less rigid than the walls of the housing.

FIG. 4 shows the electrochemical cell 10 in cross-section along line IV-IV in FIG. 2. The housing 4 is depicted in FIG. 4.

The first wall 42 and the second wall 44 each comprise a metal foil, each of which has a thickness EF between 20 µm and 150 µm, in particular between 30 µm and 60 µm. Alternatively, the thickness EF may advantageously be between 60 µm and 100 µm or between 60 µm and 90 µm. The first wall 42 and the second wall 44 may further comprise a coating, for example of thermoplastic material, on the metal foil. For example, the envelope is a multilayer film comprising, from the outside in, an electrically insulating and mechanically protective layer, an aluminium foil and a layer of polypropylene (PP) and/or acid modified polypropylene (PPa). Preferably, the wrapper is a multilayer film comprising, from the outside in, a layer of polyethylene terephthalate (PET), a layer of nylon, an aluminium foil and a layer of polypropylene (PP) and/or acid modified polypropylene (PPa).

As seen in FIG. 2, the envelope 40 comprises two first edges 48, in this case substantially parallel to each other, and two second edges 50, in this case substantially parallel to each other, and in this case substantially perpendicular to the first edges. In this case, each of the first edges is a long edge and each of the second edges is a short edge. The term "short" means that the edge is shorter than each of the long edges and "long" means that the edge is longer than each of the short edges. The first edges 48 are, for example, opposite edges to each other and the second edges 50 are, for example, also opposite edges to each other. The first and/or second edges 48 and 50 may be substantially straight.

Alternatively, the first and/or second edges 48 and 50 are not parallel, and form for example a trapezium. Alternatively, the first and/or second edges 48 and 50 are not of different length, but of the same length and thus form, for example, a square or a rhombus.

These first and second edges 48 and 50 form, when viewed from the front, generally an enveloping quadrilateral RE, in this case an enveloping rectangle (FIG. 2), which is defined by the first and second edges 48 and 50 and the extension of these edges. Edges 48 and 50 coincide with the enveloping quadrilateral. The enveloping quadrilateral RE has four corners C1, C2, C3, and C4. The four corners C1 to C4 are arranged clockwise in the Figures. Depending on the length of the first and second edges 48 and 50 and their arrangement, the enveloping quadrilateral RE may also be any quadrilateral, a square, a rhombus or a trapezium.

The first terminal of the first polarity 24 is arranged in a first corner of the enveloping quadrilateral RE, in this case C1, and the second terminal of the second polarity 28 is arranged in a second corner of the enveloping quadrilateral, in this case C3. This second corner is different from the first corner. The first corner C1 and the second corner C3 are opposite each other.

In the embodiment shown in FIGS. 2 to 4, the metal foil of the first wall and the metal foil of the second wall are two separate individual metal base foils 52, each of which has four edges. Each of the first edges 48 and the second edges 50 is formed by two edges or edge areas of the two base foils superimposed and attached to each other, for example by laser welding or heat welding. This is depicted in FIG. 4.

The envelope 40 thus comprises four sides formed by a fastening line, in particular a welding line.

According to the invention, when viewed from the front, the first terminal of the first polarity 24 is disposed entirely within the enveloping quadrilateral RE. Furthermore, when viewed from the front, the second terminal of the second polarity 28 is located entirely within the enveloping quadrilateral RE. In other words, the first and second terminals 24, 28 are arranged entirely within a cylinder having a rectangular cross-section of enveloping quadrilateral RE.

Each first terminal of the first polarity 24 and/or each second terminal of the second polarity 28 has edges which, when viewed from the front, coincide with the enveloping quadrilateral RE.

FIG. 3 shows the electrochemical cell 10 of FIG. 2, also in front view, but with the first wall 42 of the envelope 40 omitted.

The or each first terminal of the first polarity 24 consists of a superposition of electrode foils and is not folded. Likewise, each second terminal of the second polarity 28 consists of a superposition of electrode foils and is not folded.

Figure 5:
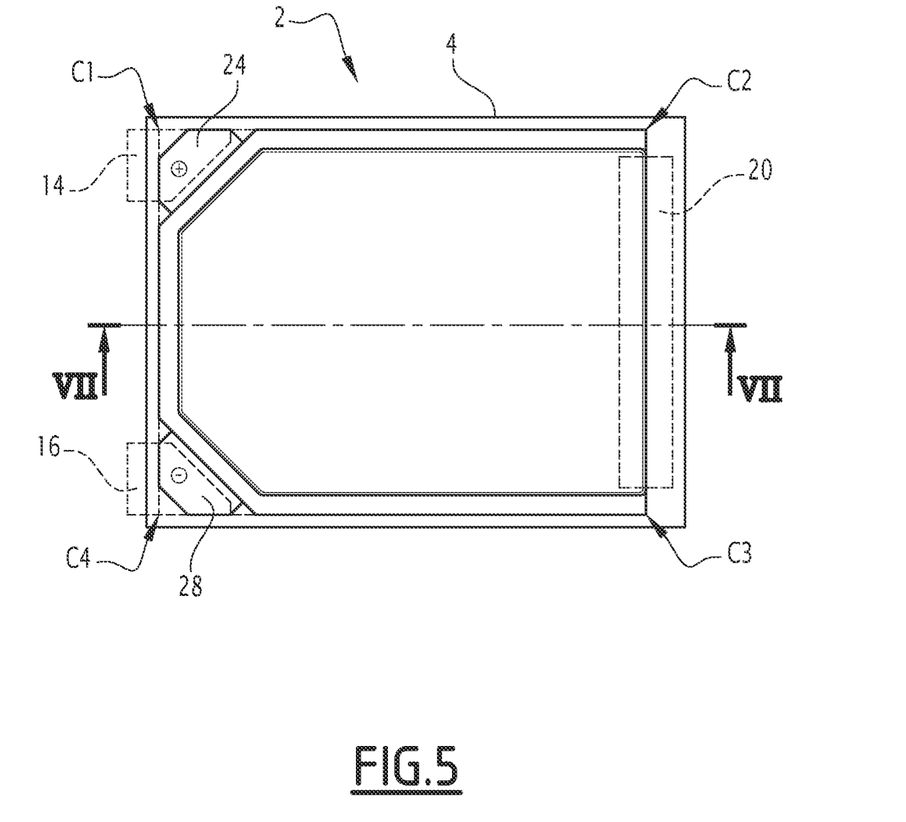
FIG. 5 is a schematic front view of a battery comprising an electrochemical cell according to a second embodiment of the invention.
Figure 6:
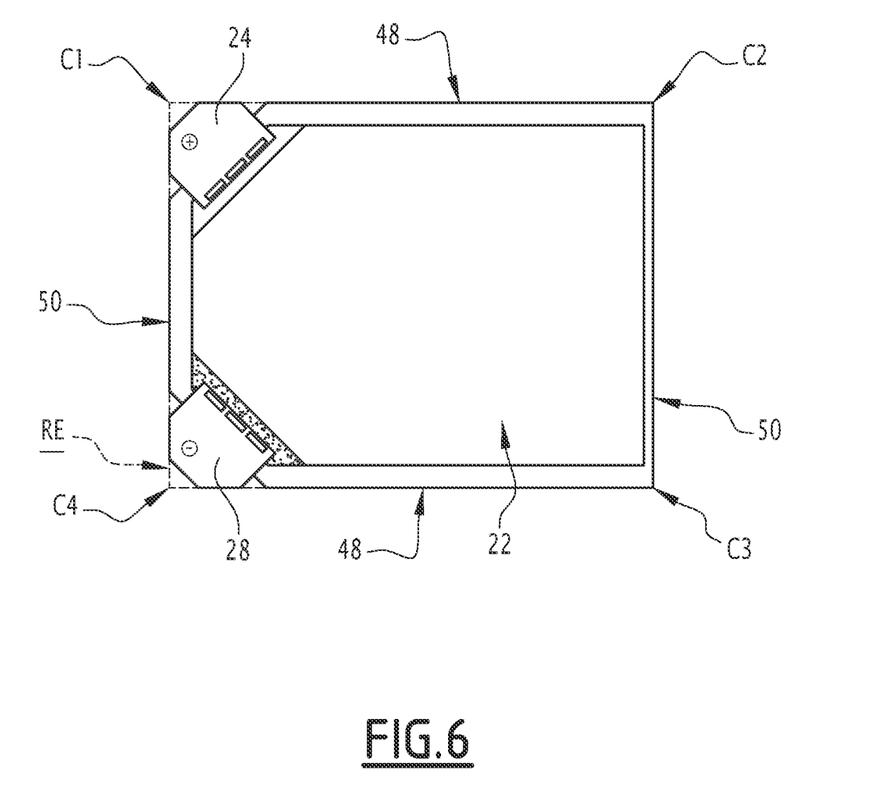
FIG. 6 is a front view of the electrochemical cell in FIG. 5, with one wall of the envelope omitted.
Figure 7:
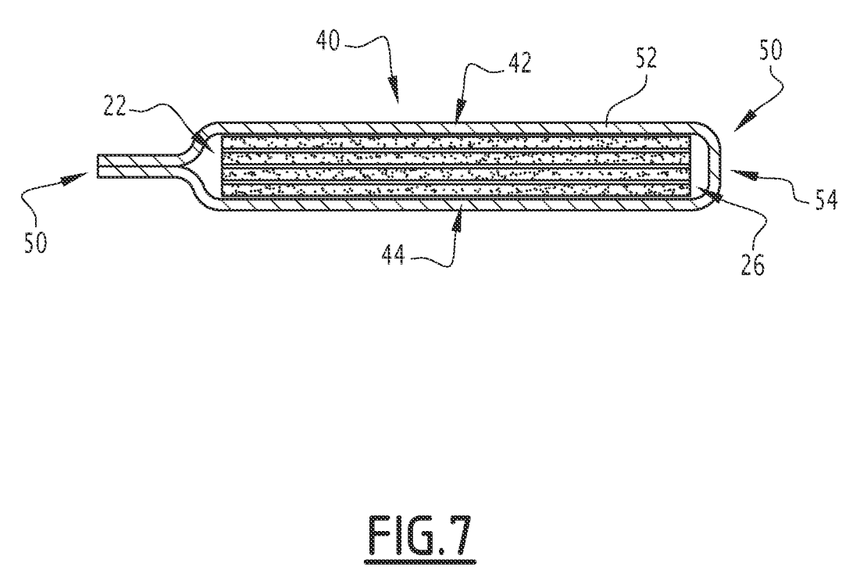
FIG. 7 is a schematic cross-sectional view of the electrochemical cell of FIG. 6.

FIGS. 5 to 7 show a second embodiment of the battery according to the invention, which differs from the above embodiment only as follows.

The battery 2 comprises a cooling device 20 which is adapted to remove heat from the electrochemical cell 10. The cooling device 20 comprises, for example, a cooling fluid circuit and means for circulating this cooling fluid.

The first corner, in which the first terminal of the first polarity 24 is located, and the second corner, in which the second terminal of the second polarity 28 is located, are adjacent to the same one of the first edges 48 or second edges 50. In this case, the first terminal of the first polarity 24 is located in corner C1 and the second terminal of the second polarity 28 is located in corner C4. The two terminals 24, 28 are therefore adjacent to the same second short edge 50.

Alternatively, not shown, the first terminal 24 is arranged in the corner C1 and the second terminal is arranged in the corner C2.

FIG. 7 shows the electrochemical cell 10 in cross-section along line VII-VII in FIG. 5. The housing 4 and the cooling device 20 are omitted in FIG. 7.

The metal foil of the first wall 42 and the metal foil of the second wall 44 are formed by a single metal base foil 52. This metal base foil 52 comprises a folded portion 54 forming one of the second edges 50.

The other second edge 50 and the first edges 48 are formed by edges of the single metal base foil superimposed and attached to each other, in particular by laser welding or heat welding. The envelope 40 thus comprises three sides formed by a fastening line, in particular a welding line, and one side formed by the folded portion 54.

Alternatively, not shown, the folded portion 54 forms one of the first edges 48.

The cooling device 20 is advantageously arranged on the side of the edge formed by the folded portion 54. This allows the cooling device to be placed in a location that is close to the heat generation areas and leads to efficient cooling.

Figure 8:
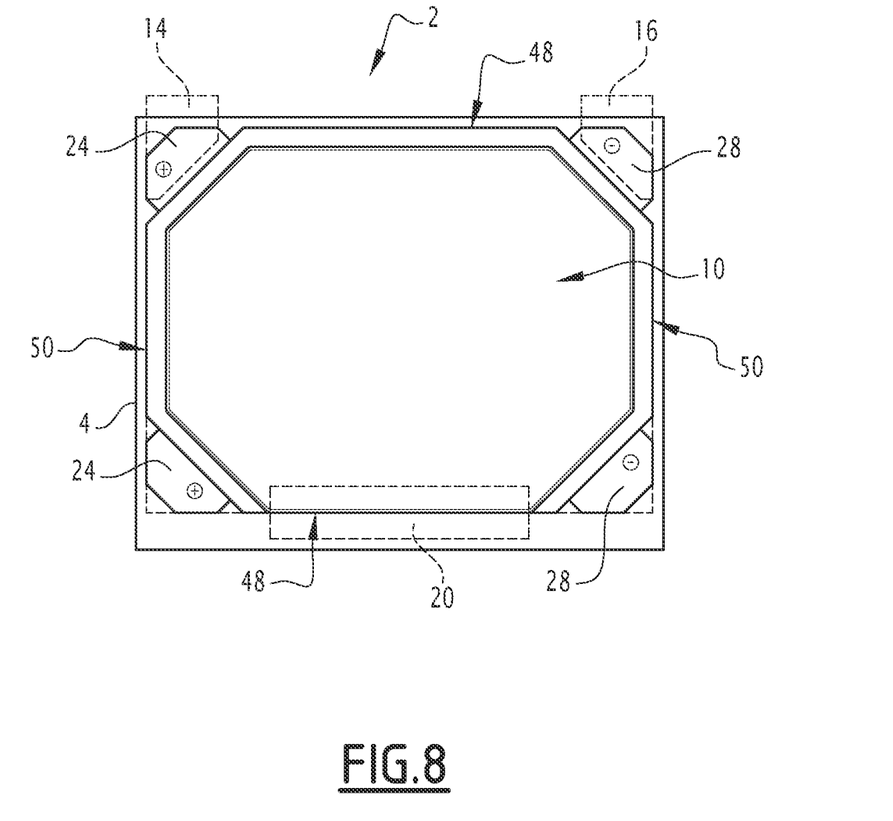
FIG. 8 is a schematic front view of a battery comprising an electrochemical cell according to a third embodiment of the invention, the view being similar to that of FIG. 5.
Figure 9:
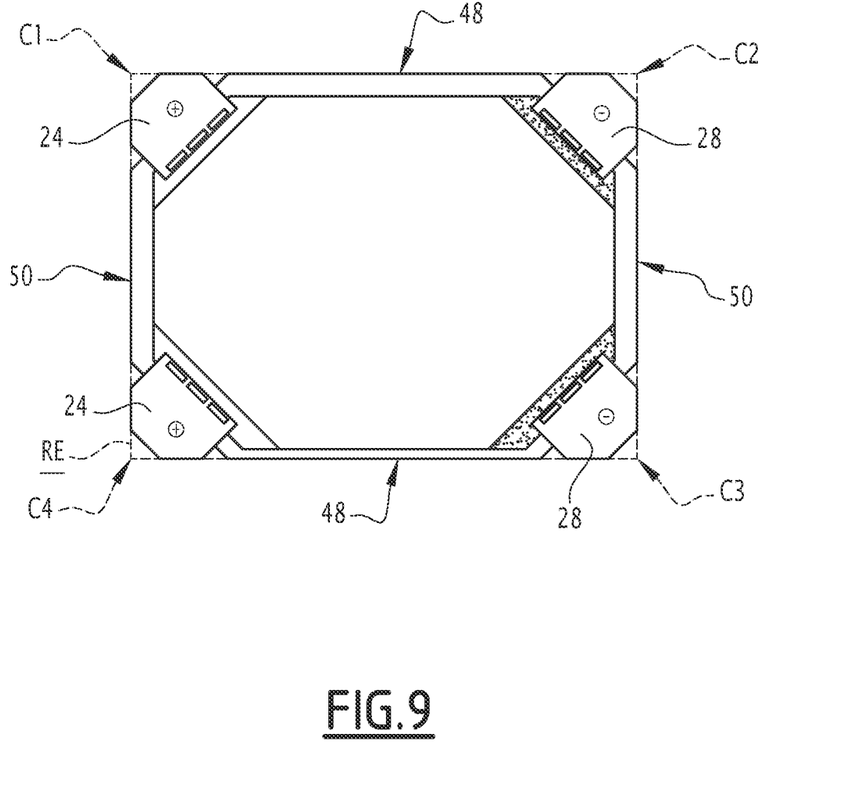
FIG. 9 is a front view of the electrochemical cell of FIG. 5, with one wall of the envelope omitted, the view being similar to that of FIG. 6.

FIGS. 8 to 9 show a third embodiment of the battery according to the invention, which differs from the previously described embodiments only as follows.

The electrochemical cell 10 comprises two first polarity terminals 24 arranged in the first corner and a third corner of the enveloping quadrilateral RE. The first two terminals of the first polarity 24 are attached and connected to the same current collector of the associated electrode.

The electrochemical cell 10 comprises two second polarity terminals 28 arranged in the second corner and a fourth corner of the enveloping quadrilateral. The second two terminals of the second polarity 28 are attached and connected to the same current collector of the associated electrode.

According to a first connection principle, the two first terminals of the first polarity 24 are connected to the same terminal 14 and the two second terminals of the second polarity 28 are connected to the same terminal 16. This variant limits the generating of heat in the event of high current being drawn at each terminal.

According to a second connection principle, only one of the first terminals of the first polarity 24 and only one of the second terminals of the second polarity 28 is connected to an individual terminal 14, 16. This variant allows the terminals to be arranged in a way that meets the installation requirements of the battery, if any.

In this embodiment, the first and third corners are adjacent corners such that the first two terminals of the first polarity 24 are adjacent to the same edge, in this case the short edge 50. The first two terminals of the first polarity 24 are located in the corners C1 and C4.

Similarly, the second corner and the fourth corner are adjacent corners, such that the two second terminals of the second polarity 28 are adjacent to the same edge, in this case the short edge 50 opposite the short edge 50 to which the first terminals of the first polarity are adjacent. The second two terminals of the second polarity 28 are located in the corners C2 and C3.

Like the second embodiment in FIGS. 5 to 7, this third embodiment comprises a single metal base foil. As a difference, the folded portion 54 forms one of the first edges 48. The other first edge 48 and the second edges 50 are formed by edges of the single metal base foil superimposed and attached to each other.

In a variant not shown, the first corner and the third corner are opposite corners and the second corner and the fourth corner are opposite corners. In this case, the locations of one of the first terminals 24 and one of the second terminals 28 adjacent to the same long edge 48 of FIGS. 8 and 9 (for example the two terminals 24, 28 at the bottom of FIGS. 8 and 9) are reversed.

The various embodiments of the battery according to the invention provide the following technical advantages and effects:

Thanks to the metal foil walls, the battery has a high degree of operational safety and a low volume.
The battery has high energy for a given volume.
The battery has a low risk of thermal runaway for a given capacity.
The battery is cheap to produce and easy to assemble.
In particular, the arrangement of the terminals in the corners of the envelope leads to an efficient use of the available space and flexibility in the arrangement of the terminals.
Furthermore, the diagonal arrangement of the terminals leads to an even distribution of heat during use.
The battery allows for an efficient arrangement of a cooling device.

The invention claimed is:

1. An electrochemical cell for a battery, comprising
a first electrode of a first polarity,
exactly one first terminal of the first polarity,
a second electrode of a second polarity,
exactly one second terminal of the second polarity,
an envelope comprising a first wall and a second wall,
the envelope comprising two first edges and two second edges,
the first and second edges forming an enveloping quadrilateral, wherein
the first terminal of the first polarity and/or the second terminal of the second polarity is disposed entirely within the enveloping quadrilateral, wherein
the first wall and the second wall each comprise a metal base foil,
the metal base foils each have a thickness of between 20 μm and 150 μm,
the first terminal of the first polarity is located in a first corner of the enveloping quadrilateral, and
the second terminal of the second polarity is located in a second corner of the enveloping quadrilateral, different from the first corner, the first corner and the second corner being adjacent to a first edge of the two first edges of the envelope or a second edge of the two second edges of the envelope.

2. The electrochemical cell according to claim 1, wherein the two first edges are longer than the second two edges.

3. The electrochemical cell according to claim 1, wherein the two first edges are substantially parallel to each other or the two second edges are substantially parallel to each other.

4. The electrochemical cell according to claim 1, wherein the metal foil of the first wall and the metal foil of the second wall are formed by a single metal base foil the metal base foil comprising a folded portion forming one of the first or second edges, the other of the first edges and second edges being formed by edges of the metal base foil superimposed and attached to each other.

5. The electrochemical cell according to claim 1, wherein the metal foil of the first wall and the metal foil of the second wall are two separate, individual metal base foils, each of which has four edges, and wherein each of the first edges and the second edges is formed by two edges of the two base foils superimposed and attached to one another.

6. The electrochemical cell according to claim 1, wherein the or each first terminal of the first polarity or each second terminal of the second polarity consists of a superposition of electrode foils and is not folded.

7. A battery of the type comprising a housing and at least one electrochemical cell, characterized in that the electrochemical cell is a cell according to claim 1.

8. The battery according to claim 7, wherein the battery comprises a cooling device and wherein the cooling device is adapted to remove heat from the electrochemical cell.

9. The electrochemical cell according to claim 1, wherein the metal base foils each have a thickness of between 30 μm and 60 μm.

10. The electrochemical cell according to claim 3, wherein the two second edges are substantially perpendicular to the first edges.

11. The electrochemical cell according to claim 4, wherein the edges of the metal base foil attached to each other are attached to each other by heat welding.

12. The electrochemical cell according to claim 5, wherein the edges of the metal base foil attached to one another are attached to one another by heat welding.

13. The battery according to claim 8, wherein cooling device is adapted to remove heat from a long edge or from the edge formed by the folded portion.

* * * * *